and Lee De Pree, Holland, Mich., assignors to
The Dow Chemical Company, Midland, Mich.,
a corporation of Delaware

UNITED STATES PATENT OFFICE 2,511,820

PREPARATION OF ORGANOHALOSILANES

Arthur J. Barry and Donald E. Hook, Midland,
and Lee De Pree, Holland, Mich., assignors to
The Dow Chemical Company, Midland, Mich.,
a corporation of Delaware No Drawing. Application September 13, 1947,
Serial No. 773,926

9 Claims. (Cl. 260—448.2)

This invention relates to the preparation of organohalosilanes. It is particularly concerned with an improved method for the production of an organohalosilane in which the silicon atom is bonded to a carbon atom in an aromatic ring. This application is a continuation-in-part of our copending application Serial Number 674,926 filed June 6, 1946.

In our copending patent application Serial No. 674,925, filed June 6, 1946, it has been shown that an olefinic hydrocarbon may be caused to combine chemically with a halomonohydrosilane, such as $HSiCl_3$, to produce an alkylhalosilane.

It is an object of this invention to prepare an aromatic organohalosilane in which the silicon atom is bonded to a carbon atom in an aromatic ring.

It is a further object of this invention to prepare an aromatic chlorosilane in which the silicon atom is bonded to a carbon atom in a benzenoid radical.

In accordance with the present invention, an aromatic halohydrocarbon which contains at least one halogen atom bonded to a carbon atom in an aromatic ring is reacted with a halomonohydromonosilane which contains a hydrogen atom and at least one halogen atom bonded to the silicon atom. The reaction is conducted at an elevated temperature under sufficient pressure to ensure the presence of at least some condensed phase in the reaction zone. The products of said reaction constitute, for the most part, an organohalosilane in which the silicon atom is bonded directly to a carbon atom in an aromatic ring, and a more highly halogenated halosilane than that employed as a reactant.

Aromatic halohydrocarbons which are suitable for purposes of this invention are benzene derivatives containing at least one halogen bonded to a carbon atom in the ring. The benzene ring may have attached thereto substituents other than halogen and hydrogen atoms, as illustrated by ethylchlorobenzene, isopropylchlorobenzene, 2-chlorobiphenyl, chloronaphthalene; or halogen and hydrogen atoms may constitute the only substituents bonded to the carbon atoms, as illustrated by monochlorobenzene, orthodichlorobenzene, paradichlorobenzene, tetrachlorobenzene.

As previously stated, halomonohydrosilanes which may be employed as starting materials in the process of this invention are halosilanes which contain one hydrogen atom, and at least one, and preferably more than one, halogen atom bonded to the silicon atom. Examples of halomonohydrosilanes include trichlorosilane, $HSiCl_3$, mono- methyldichlorosilane, $CH_3SiHCl_2$, monophenyldichlorosilane, $C_6H_5SiHCl_2$.

In a preferred form of the present invention, reaction between an aromatic halohydrocarbon and a halomonohydrosilane is carried out at a temperature within the range of from 250° C. to 460° C. under conditions of pressure sufficient to ensure the presence of at least some condensed or liquid phase at said temperature. This may be accomplished in various ways, such as by introducing the reactants into the reaction zone under pressure, or by operating under autogenous pressure in a closed system. Frequently, one or more of the reactants is normally liquid at the preferred temperature within the range stated above, and serves as a solvent for other starting materials. Under such conditions, the reaction may proceed at a relatively low pressure, such as a gauge pressure of 5 atmospheres, or even less.

Apparently the reaction between an aromatic halohydrocarbon and a halomonohydrosilane is predominantly one of addition, with the formation of a complex which is not stable under the reaction conditions, and which rearranges, with elimination of a hydrogen halide. Said hydrogen halide in turn reacts with the halomonohydrosilane starting material to produce a more highly halogenated silane and hydrogen. The overall reaction may be illustrated by the following equations:

(1) 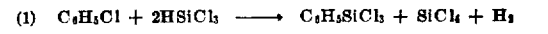

(2) 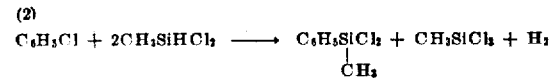

That the reaction would proceed in the manner illustrated is not obvious, inasmuch as the following reaction might normally be expected to take place:

(3) 

Reaction (3) does occur as a competing reaction in our process, but only to a minor extent, whereas Reaction 1 or 2 predominates, depending of course upon the starting chloromonohydrosilane, with the production of an organochlorosilane in good yield.

When the starting aromatic halohydrocarbon contains a plurality of halogen atoms, more than one halogen may be removed from the ring, and a like number of halosilyl radicals become bonded to the ring. Accordingly, compounds of the types

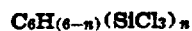

and $C_6H_{(6-n)}(SiRCl_2)_n$, where $n$ is a whole number less than six and R is a monovalent hydrocarbon radical, are conveniently prepared by the process of this invention.

From Equations 1 and 2, it may also be seen that it is of advantage to employ approximately two molecular equivalent weights of the halomonohydrosilane for each halogen atom to be replaced in the starting aryl halide. However, much greater or smaller proportions of reactants may be employed if desired.

The following examples illustrate certain ways in which the principle of the invention has been applied, but are not to be construed as limiting the scope of the invention. In each of the examples, the reactants were placed in a bomb, which was then closed and heated at the temperature indicated. In each run some condensed phase was present during the heating period given.

*Example 1*

A bomb of 500 milliliter capacity was charged with 112.5 grams of chlorobenzene and 67.7 grams of trichlorosilane. The bomb and contents were heated for about 18 hours at a temperature of 354°–370° C. During this time, the maximum pressure attained within the bomb was 1060 pounds per square inch. The bomb was cooled, and the products collected and purified by fractional distillation. There were obtained 34.7 grams of phenyltrichlorosilane and 60.8 grams of silicon tetrachloride. Unreacted chlorobenzene was recovered.

*Example 2*

A mixture comprising 379.8 grams of parachlorotoluene and 813 grams of trichlorosilane, was heated in a bomb of 2.4 liter capacity for 12 hours at a temperature of 370°–380° C. The maximum pressure developed within the bomb was 1910 pounds per square inch. Fractional distillation of the reaction products yielded 425 grams of tolyltrichlorosilane, and 457.2 grams of silicon tetrachloride. Unreacted trichlorosilane and parachlorotoluene were recovered.

*Example 3*

The experiment described in Example 2 was repeated, except that 421.8 grams of ethylchlorobenzene was employed as the aryl halide reactant. There were obtained 409 grams of ethylphenyl trichlorosilane, $C_2H_5C_6H_4SiCl_3$, and 405 grams of silicon tetrachloride. Unreacted starting materials were recovered.

*Example 4*

A mixture of approximately 467 grams of cumyl chloride and 813 grams of trichlorosilane was heated in a 2.4 liter bomb for 12 hours at a temperature of from 370° to 380° C. During the heating period, the maximum pressure developed within the bomb was 1750 pounds per square inch. Cumyl trichlorosilane and silicon tetrachloride were produced.

*Example 5*

A mixture comprising 441 grams of orthodichlorobenzene and 813 grams of trichlorosilane was heated in a 2.4 liter bomb for 12 hours at 370°–382° C., and a maximum pressure of 1600 pounds per square inch. The products were collected and fractionally distilled. There were obtained 375 grams of silicon tetrachloride, $SiCl_4$; 299 grams of chlorophenyltrichlorosilane,

105 grams of phenyltrichlorosilane, and several grams of material distilling within the range of from 140.5° to 149° C. at 10 millimeters absolute pressure. This material comprised a mixture of crystalline and liquid isomers of bis(trichlorosilyl)benzene. p - Bis(trichlorosilyl)benzene is crystalline at ordinary temperatures, and distills at 168° C. at 30 millimeters absolute pressure. An isomer, liquid at room temperature, distills at about 161.5° C. at 30 millimeters.

*Example 6*

A mixture of 441 grams of paradichlorobenzene and 813 grams of trichlorosilane was heated in a 2.4 liter bomb for 16.5 hours at a temperature of from 365° to 375° C. and a maximum pressure of about 1900 pounds per square in. Fractional distillation of the resultant product yielded 465 grams of silicon tetrachloride, 227 grams of chlorophenyltrichlorosilane, 100 grams of phenyltrichlorosilane and 181 grams of bis(trichlorosilyl)benzene.

*Example 7*

A mixture of 526 grams of 2-chlorobiphenyl and 807 grams of trichlorosilane was heated in a 2.4 liter bomb for 16 hours at a temperature of 368° C., and a maximum pressure of 1375 pounds per square inch. The reaction products were cooled and collected and subsequently fractionally distilled. There were obtained 118 grams of liquid xenyltrichlorosilane as a fraction distilling at 203° C. at 30 millimeters absolute pressure, and having a density of 1.307. The fraction distilling at from 203° to 209° C. at 30 millimeters absolute pressure and amounting to 57 grams, crystallized readily to give an isomeric form of xenyltrichlorosilane. Silicon tetrachloride was also produced.

*Example 8*

A mixture of 108 grams of 1,2,3,5-tetrachlorobenzene and 135.5 grams of trichlorosilane was heated in a bomb for 16 hours at 334–359° C. and a maximum pressure of 1080 pounds per square inch. The product was a mixture of crystalline solids and a dark liquid.

*Example 9*

A mixture comprising 225 grams of chlorobenzene and 460 grams of monomethyldichlorosilane was heated at a temperature of from 445° to 460° C. in a 2.4 liter bomb for approximately 16 hours. During this time, the maximum pressure attained within the bomb was 1725 pounds per square inch. The product was cooled and collected and subsequently was fractionally distilled. Phenylmethyldichlorosilane was obtained as a fraction distilling at approximately 114° to 115° C. at 50 millimeters absolute pressure. Methyl trichlorosilane, and unreacted methyldichlorosilane were also obtained.

*Example 10*

A mixture of 488 grams of alpha-chloronaphthalene and 815 grams of trichlorosilane was heated in a bomb of 2.4 liter capacity for 12 hours, at a temperature of from 368° to 380° C. During this time a maximum pressure of 1400 pounds per square inch was developed within the bomb. Fractional distillation of the product yielded 354.3 grams of naphthyltrichlorosilane, 453.4 grams of silicon tetrachloride, 434 grams of naphthalene, and 42.4 grams of a product distilling at 232°–233° C. at 30 millimeters absolute pressure and containing bis(trichlorosilyl)naphhalene. Unreacted chloronaphthalene and trichlorosilane were recovered.

Example 11

A mixture comprising 1765 grams of paradichlorobenzene and 2760 grams of methyldichlorosilane, $CH_3SiHCl_2$, was heated in a bomb of 3.8 gallon capacity for 16 hours at a temperature of from 395° to 410° C. The maximum pressure attained within the bomb was 1350 pounds per square inch. Fractional distillation of the reaction product yielded 444 grams of phenylmethyldichlorosilane, $C_6H_5(CH_3)SiCl_2$, 347 grams of (chlorophenyl)methyldichlorosilane, $ClC_6H_4(CH_3)SiCl_2$, 1946 grams of methyltrichlorosilane, $CH_3SiCl_3$, and 455 grams of a mixture of bis(methyldichlorosilyl)benzenes distilling within the range of from 164° to 169° C. at 30 millimeters. p-Bis(methyldichlorosilyl)benzene crystallized from the latter cut. It is crystalline at room temperature, and has a boiling point of 169° C. at 30 millimeters absolute pressure. The liquid portion of the cut is an isomer of the para-derivative, and distills at 164.5°–165.0° at 30 millimeters. Unreacted paradichlorobenzene was recovered.

What is claimed is:

1. The process which comprises reacting an aromatic halohydrocarbon which contains at least one halogen atom bonded to a carbon atom in an aromatic ring with a halomonohydrosilane of the general formula $R_nHSiCl_{3-n}$, in which R represents a monovalent hydrocarbon radical and $n$ has a value of from 0 to 1 inclusive, at a temperature of from 250° C. to 460° C., at least a portion of the reactants being in condensed phase, to produce an organohalosilane in which a silicon atom is bonded to a carbon atom in the aromatic ring of said halohydrocarbon, with the elimination of one halogen from said halohydrocarbon per silicon atom so bonded.

2. The process which comprises reacting an aromatic chlorohydrocarbon containing at least one chlorine atom bonded to a carbon atom in an aromatic ring with a chloromonohydrosilane of the general formula $R_nHSiCl_{3-n}$, in which R represents a monovalent hydrocarbon radical and $n$ has a value of from 0 to 1 inclusive, at a temperature of from 250° C. to 460° C. and a pressure sufficient to ensure at least a portion of the reactants being in condensed phase, to produce an organochlorosilane in which a silicon atom is bonded to a carbon atom in said aromatic ring of said chlorohydrocarbon, with the elimination of one chlorine atom from said chlorohydrocarbon per silicon atom so bonded.

3. The process which comprises reacting an aromatic chlorohydrocarbon containing at least one chlorine atom bonded to a carbon atom in an aromatic ring with trichloromonohydrosilane, at a temperature of from 250° to 460° C., at least a portion of the reactants being in condensed phase, to produce an organochlorosilane wherein a trichlorosilyl radical is bonded to a carbon atom in said aromatic ring of said chlorohydrocarbon, with the elimination of one chlorine atom from said chlorohydrocarbon per trichlorosilyl radical so bonded.

4. The process which comprises reacting chlorobenzene with trichloromonohydrosilane at a temperature of from 250° to 460° C., at least a portion of the reactants being in condensed phase, whereby to produce phenyltrichlorosilane.

5. The process which comprises reacting an aromatic chlorohydrocarbon containing at least one chlorine atom bonded to a carbon atom in an aromatic ring with a chloromonohydrosilane of the general formula $RHSiCl_2$, where R is a monovalent hydrocarbon radical, at a temperature of from 250° to 460° C., at least a portion of the reactants being in condensed phase, to produce a diorganodichlorosilane in which the silicon atom is bonded to a carbon atom in the aromatic ring of said chlorohydrocarbon with the elimination of one chlorine atom from said chlorohydrocarbon per silicon atom so bonded.

6. The process which comprises reacting chlorobenzene with methyldichlorosilane at a temperature of from 250° to 460° C., at least a portion of the reactants being in condensed phase, whereby to produce phenylmethyldichlorosilane.

7. The process which comprises reacting dichlorobenzene with methyldichlorosilane at a temperature of from 250° to 460° C., at least a portion of the reactants being in condensed phase, whereby to produce bis(methyldichlorosilyl)benzene.

8. The process in accordance with claim 2 in which the aromatic chlorohydrocarbon is chlorobiphenyl and the chloromonohydrosilane is trichloromonohydrosilane.

9. The process in accordance with claim 2 in which the aromatic chlorohydrocarbon is tetrachlorobenzene and the chloromonohydrosilane is trichloromonohydrosilane.

ARTHUR J. BARRY.
DONALD E. HOOK.
LEE DE PREE.

REFERENCES CITED

The following references are of record in the file of this patent:

UNITED STATES PATENTS

| Number | Name | Date |
|---|---|---|
| 2,352,974 | Rochow | July 4, 1944 |
| 2,379,821 | Miller | July 3, 1945 |
| 2,405,019 | Dalin | July 3, 1946 |
| 2,407,181 | Scott | Sept. 3, 1946 |

Certificate of Correction

Patent No. 2,511,820                                                              June 13, 1950

ARTHUR J. BARRY ET AL.

It is hereby certified that error appears in the printed specification of the above numbered patent requiring correction as follows:

Column 5, line 46, for "$R_nHSiCl_{y-n}$" read $R_nHSiCl_{3-n}$;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*